Oct. 10, 1961 W. F. WINGARD ET AL 3,003,739
VIBRATION ISOLATOR
Filed Oct. 14, 1959 4 Sheets-Sheet 1
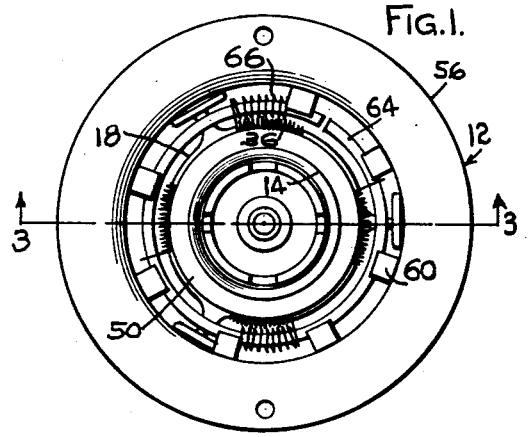
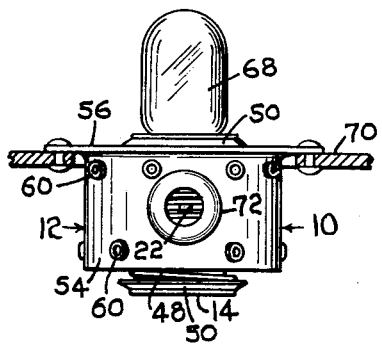
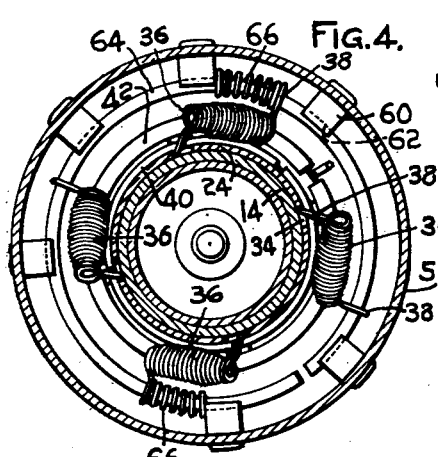
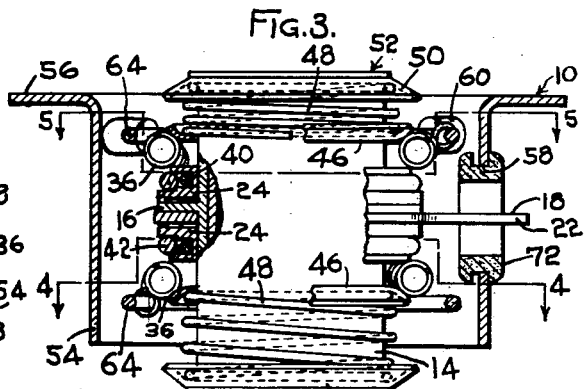
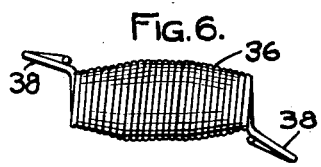
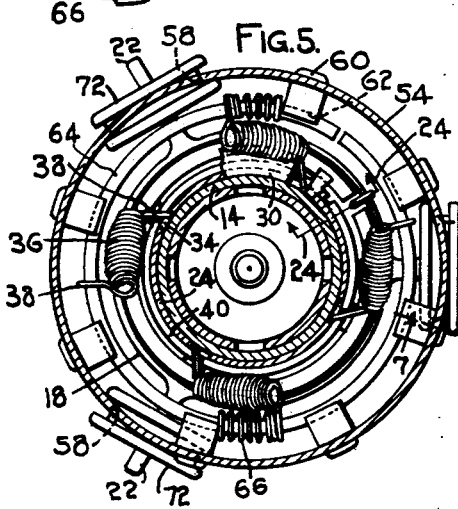
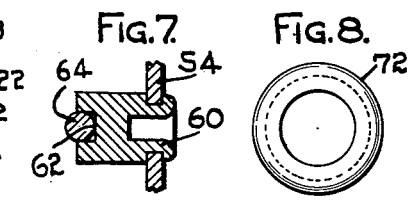
INVENTORS:
WILLIAM F. WINGARD,
RAYMOND A. GOSSELIN,
BY Walter S. Jones
ATTORNEY.

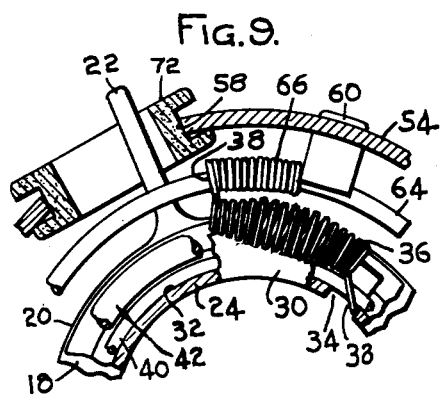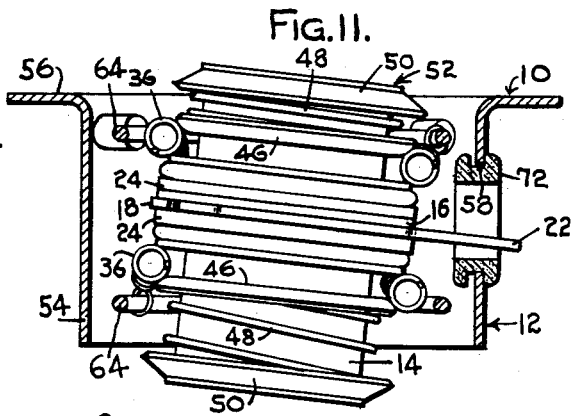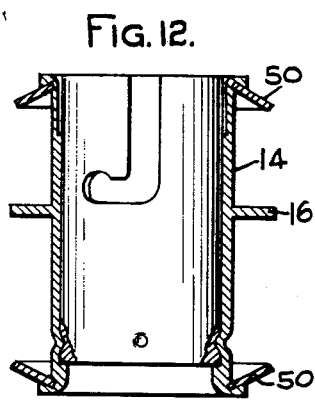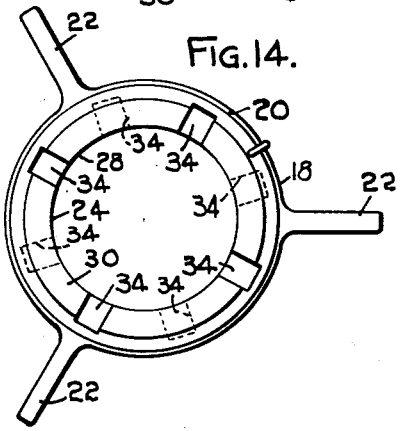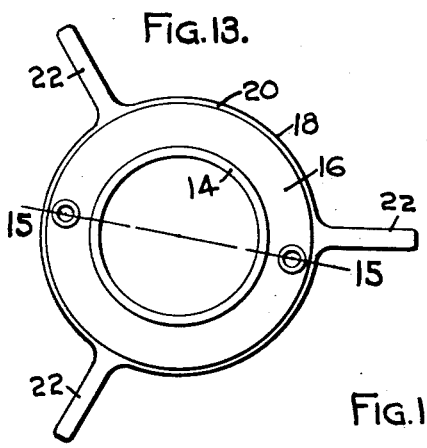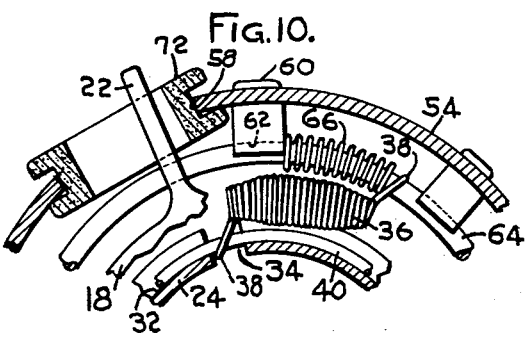

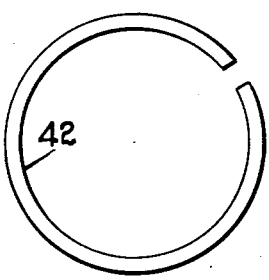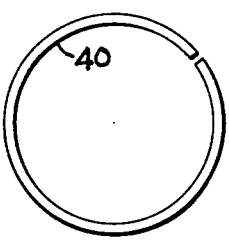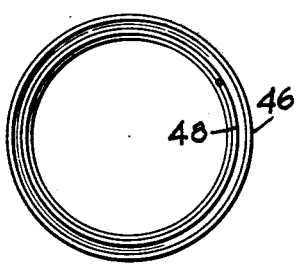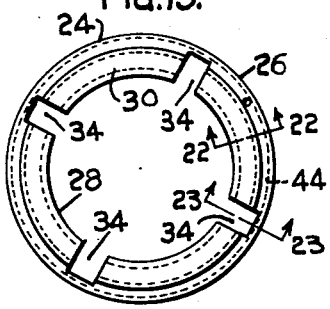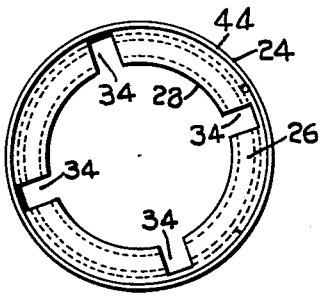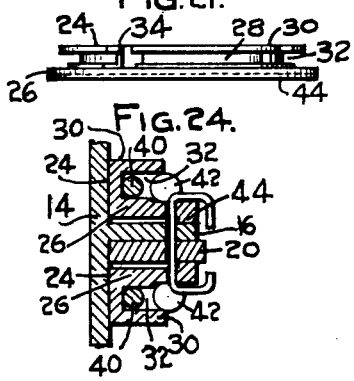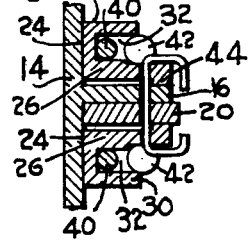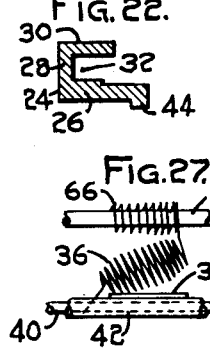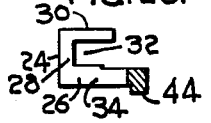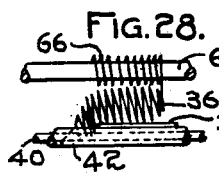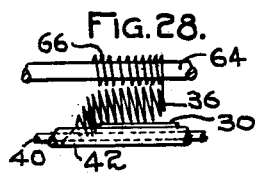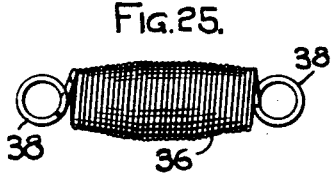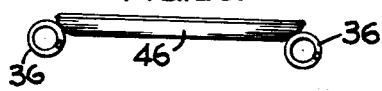

INVENTORS:
WILLIAM F. WINGARD,
RAYMOND A. GOSSELIN,
BY Walter S. Jones
ATTORNEY.

United States Patent Office 3,003,739
Patented Oct. 10, 1961

3,003,739
VIBRATION ISOLATOR
William F. Wingard, Newtonville, and Raymond A. Gosselin, Northeaston, Mass., assignors, by direct and mesne assignments, of one-half to United-Carr Fastener Corporation, Cambridge, Mass., a corporation of Delaware, and one-half to A. Wells & Company Limited, London, England, a corporation of Great Britain
Filed Oct. 14, 1959, Ser. No. 846,340
5 Claims. (Cl. 248—358)

This invention relates to vibration isolators and more specifically to isolators using a spring means as the resilient mounting.

Generally speaking, an isolator is used to prevent destructive effects to an object caused by vibrations. They can be used in two classes of cases, first, where the vibrating object is a machine and it is desired to reduce its vibrations to a support, such as a factory floor; second, where the support is vibrating and it is desired to isolate a delicate instrument mounted in the support. These vibrations can be of two types. (1) Continuous vibrations of a small amplitude. (2) The occasional shock, impact or momentary vibration of larger force or amplitude, such as may result from sudden changes in velocity in an airplane.

Originally, rubber was used as an isolator and one example of this type is a sandwich composed of alternating layers of sheets of rubber and sheets of metal. Rubber, however, has many faults among which is the fact that it must be able to flow before it can yield. Furthermore, it can be physically deteriorated by contact with certain chemicals and it is not capable of standing up under extremes of temperature. To avoid the problem of noncompressibility of rubber, diaphragms made of rubber were used and in fact, isolators of this type are still used today in certain situations.

To avoid most of the difficulties which are inherent in a rubber isolator, metal springs came into use. Springs are capable of operating in the three dimensions of space as contrasted with the action of an ordinary rubber unit of the shear type. One of the difficulties of using a simple coil spring is that the external vibrations may reach the natural or harmonic period of the spring which would cause it to amplify the vibrations rather than isolate them. This tendency can be counteracted by the use of snubbing devices such as another spring, felt, rubber, etc. The first method that the applicant can discover which was used to counteract this tendency was to provide a rubber member in series with the metal spring to prevent the transmission of high frequency vibration. This type of isolator, however, is not too effective when subjected to a vibration along the rotational or lateral mode. This tendency of "galloping" found in springs can also be alleviated or counteracted by associating the main spring with a secondary spring, having a different period, in such manner that differences in vibration introduce frictional or snubbing action between them, tending to dissipate the incoming energy in the form of heat.

A still later improvement is made by a columnar member centrally to the walls of a base member by two sets of helical coil springs under substantially equal tension. One end of each set of springs is attached respectively to the top and bottom of the columnar member, the other ends of the springs being attached to the base as shown in the United States Letters Patent to W. E. Barber et al., No. 2,600,090.

The principal object of the invention is to provide an improved vibration isolator. In another aspect, the principal object of the invention is to provide means for damping the resonant vibrations of a coil spring in all possible modes of vibration.

In still another aspect, the principal object of the invention is to provide an improved vibration isolator of the aforesaid type having resilient means for isolating the effects of a shock on the system to be isolated.

Other objects of the invention will, in part, be obvious, and will, in part, appear hereinafter.

In the drawings:

FIG. 1 is a plan view of the isolator without the light bulb, the springs are shown diagrammatically;

FIG. 2 is a side elevation of the isolator with a light bulb mounted and fastened to the support as viewed from the right side of FIG. 1;

FIG. 3 is a section on line 3—3 of FIG. 1, partly broken away and partly in section;

FIG. 4 is a section on line 4—4 of FIG. 3, the springs are shown diagrammatically, and the spring retainer is shown in section;

FIG. 5 is a section on line 5—5 of FIG. 3 similar to FIG. 4, a portion of the spring retainer being in plan view;

FIG. 6 is an elevation of a barrel spring;

FIG. 7 is a section on line 7—7 of FIG. 5;

FIG. 8 is an elevation of the snubber ring;

FIG. 9 is an enlarged view of a portion of FIG. 5 with the springs shown diagrammatically under compression and expansion when the spider is turned;

FIG. 10 is a view similar to FIG. 9 of the lower springs when the spider is turned;

FIG. 11 is a view similar to FIG. 3 with the isolator in a tilted position, partly in section;

FIG. 12 is a sectional view of the mounting cylinder;

FIG. 13 is a plan view partly in section of the spider mounted on cylinder;

FIG. 14 is a plan view of the spider with spring mounting ring in position;

FIG. 15 is a section on line 15—15 of FIG. 13;

FIG. 16 is a plan view of the retaining spring;

FIG. 17 is a plan view of the mounting spring;

FIG. 18 is a plan view of the spring retaining collar with spring in section;

FIG. 19 is a plan view of the mounting collar;

FIG. 20 is an underneath plan of the mounting collar;

FIG. 21 is a view in elevation of the mounting collar;

FIG. 22 is a section taken on line 22—22 of FIG. 19;

FIG. 23 is a section taken on line 23—23 of FIG. 19;

FIG. 24 is a section taken on line 24—24 of FIG. 5 showing the method of fastening the mounting collar;

FIG. 25 is a plan view of the barrel spring;

FIG. 26 is a view in elevation of the retaining collar in contact with the barrel springs;

FIG. 27 is a diagrammatic view showing springs in normal position;

FIG. 28 is a view similar to FIG. 27 with spring compressed;

Figure 29:
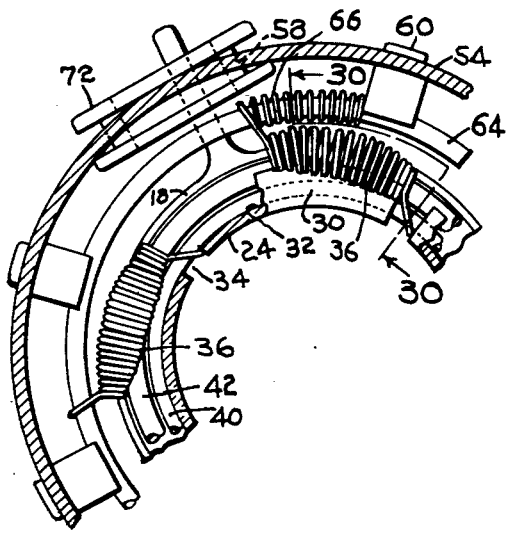
FIG. 29 is an enlarged section view of a portion of isolator in raised position showing relation of springs.

Referring to the drawing there is shown a vibration isolator 10 comprising a tubular base member 12, a tubular columnar member 14 having a flange 16 attached to and circumscribing said columnar member 14 a predetermined distance between its open ends as shown in FIG. 3. Included is a spider 18 having a collar-like body 20 and fingers 22 radiating away from the axis of the body 20. The body 20 is attached to the flange 16 by means of rivets passed through apertures formed in said body 20 and said flange 16 (see FIG. 15). The body 20 overlaps the flange 16 as shown in FIG. 3.

The next element to be discussed is a circumferential spring retainer collar 24 having a skirt portion 26 in integral right angle relationship with one edge of a tubular wall 28 and in spaced parallel relationship with a curb portion 30 which is also in integral right angle relationship with said tubular wall 28. The skirt portion 26, tubular wall 28 and curb portion 30 form a retainer channel 32 which is interrupted at four points equidistant from the points on each side by an aperture 34 as best shown at FIGS. 5, 19 to 24 inclusive. The tubular wall 28 forms an interrupted circumference within the circumference formed by the skirt portion 26. Four barrel springs 36 having connector loops 38 at each terminal and are attached to a circular connector spring 40, split at one point. By passing an end of the spring 40 through one of the loops 38, the connector spring 40 is then placed into the retainer channel 32 with the loop 38 of each of the four barrel springs 36 lying within the walls of the aperture 34 as shown in FIGS. 4 and 5. As a precautionary measure to prevent the comparatively weak tensioned connector spring 40 from being pulled free, when tension is applied to the barrel springs 36, a comparatively strong tensioned circumferential retainer spring 42 is placed under tension into the retainer channel 32 to overlap the connector spring 40 and assist it in resisting the tendency to pull free as mentioned heretofore. In integral right angle relationship with the outer circumference of the skirt portion 26 on the opposite side of said skirt portion 26 from said tubular wall 28 is a spring retainer collar spacer 44. The assembled unit consisting of the retainer collar 24, the barrel springs 36, the connector spring 40 and the retainer spring 42 is placed around the columnar member 14 on each side of said flange 16 and spider 18 as shown in FIG. 3 whereby the tubular wall 28 of the spring retainer collar 24 abuts circumferentially the said columnar member 14 and the spring retainer spacer 44 rests against either the flange 16 of the columnar member 14 or the body 20 of the spider 18 because a single assembled unit is placed on each side of said flange 16. Since one side of said flange 16 is covered by the body 20 of the spider 18, the said spacer 44 of one of the units will rest against the body 20 rather than the flange 16.

A damper collar 46 in the form of a ring of metal or semi-rigid material having an axial opening whose diameter is slightly greater than the diameter of the columnar member 14 is fitted around said columnar member 14 on each side of said flange 16 to rest against the barrel springs 36. A helical damper spring 48 is placed to circumscribe the columnar member 14 and abut the damper collar 46 as shown in FIG. 3. A retainer ring 50 can now be fastened to each end of the columnar member 14 circumscribing said member 14 abutting and compressing the damper spring 48 against the damper collar 46 and holding the said spring 48 and collar 46 in assembly.

The assembly of the closure or member 14, the spider 18, the pair of retainer collars 24, connector and retainer springs 40 and 42, the pair of damper springs 48, the pair of damper collars 46 and the pair of retainer rings 50 will be referred to hereinafter as the anti-vibration assembly 52. A C-shaped retaining staple (unnumbered) is used to secure the spring retainer collars 24 to the flange 16 as best shown in FIG. 24.

Said tubular member 12 comprises a cylindrical body 54 open at both ends and a base flange 56 integral with said body 54 at one end thereof, circumventing said body 54 as shown in FIG. 1 and in right angle relationship with said body 54.

Three apertures 58, are formed in said body 54 having centers 120° from each other and whose axes are in right angle relationship with the axis of said cylindrical body 54. Two sets of slotted studs 60 are integrally attached to the inside circumference of said body 54 close to each open end as illustrated in FIGS. 4 and 5 and the slots 62 of the studs 60 are placed in spaced parallel relationship with the plane of the said body 54. The said studs 60 protrude a short distance into the area encompassed by the body 54.

The anti-vibration assembly 52 and 8 barrel springs are placed into the area encompassed by the body 54 of the base member 12 with the fingers 22 of the spider 18 passing between the walls of the apertures 58 formed in the body 54 and the terminal ends of said fingers 22 protruding beyond the said body 54 in spaced parallel relationship with the flange 16 of said base member 16, so that the axis of said assembly 52 and said base member 12 are coincident.

A split ring member 64 having two straight helical springs 66 movably engaged therewith along their longitudinal axis, as shown in FIG. 4, can now be attached to the base member 12 and the anti-vibration assembly 52. This attachment is accomplished by snapping the said split ring member 64 into the slots 62 of the studs 60 after passing the said split ring member 64 through the connector loops 38 of the lower springs 36. When the attachment is complete each of the straight helical or return springs 66 abut a connector loop 38 and a stud 60 and the two straight helical springs 66 are in spaced opposed relationship as shown in FIG. 4. Of course, two attachments are made using the ring member 64 and the return springs 66 at the two rows of studs 60. The columnar member 14 can be designed to accept different objects to be isolated. In the embodiment illustrated the columnar member 14 is shown designed to engage a light bulb 68.

The flange 56 of the base member 12 is attached to an apertured support 70 by an appropriate means such as rivets and the body 54 of the base member 12 projected between the walls of the aperture in the support as shown in FIG. 2.

Figure 30:
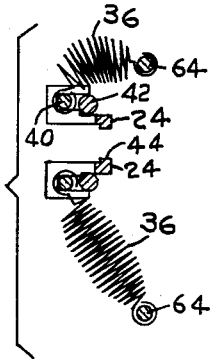
FIG. 30 is a diagrammatic section taken on line 30—30 of FIG. 29.
Figure 32:
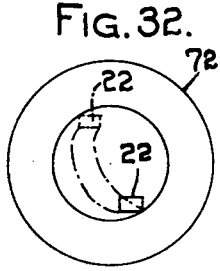
FIG. 32 is a diagrammatic view showing path of spider in dot and dash lines on application of vibrating forces.

The applicants will now set out in detail the reaction of the isolator 10 to different stresses. For purposes of this discussion the top of the isolator will be taken as that shown in FIG. 1. If an axial force were applied to the anti-vibration assembly 52, the barrel springs 36 at the top of the isolator would bend across the damper collar 46 compressing the damper spring 48. Note that the force applied to the barrel springs 36 is greatest at the point of largest diameter. At the same time there is some axial stretching over the barrel spring 36 from its point of attachment at the assembly 52 and at the split ring member 64. This application of force on said barrel spring tends to contract the spring at the point of tension while opening the spring in diminishing amounts from the point directly opposite to the point of tension, toward the terminal ends. This is best illustrated at FIGS. 28 through 30 of the drawings. The obvious advantage in this case is that the larger diameter of the barrel spring takes the greater stress and therefore the life of the spring in the mount is increased tremendously. In other words, there is less possibility of the spring becoming fatigued in use. Of some importance is the fact that, if this axial force were varied in an up and down motion, the connector loops 38, engaged with the split ring member 64, would tend to assume slightly different positions on the said ring 64 creating some friction damping and also varying the exact point of stress on the barrel spring. The springs 36 on the bottom of the anti-vibration assembly 52 would bend in the same direction as the top barrel springs as aforesaid except these springs would be bent across the curb portion 30 of the spring retainer collar 24. When the action is reversed, the springs would reverse their bending action, as described above, top springs assuming the position of the bottom springs. As I have mentioned heretofore, the fingers 22 of the spider 20 have their terminal ends at the approximate center of the apertures 58 in the cylindrical body 54. When axial stress is placed on the anti-vibration assembly 52 at moderately high frequencies, the pattern that said fingers 22 move through, may be best described as "banana-shaped. In other words, the path of the fingers 22 does not describe a line in spaced parallel relationship with the axis of the anti-vibration assembly 52 (see FIG. 32). This action sets up frictional forces between the barrel springs and the damper collar 46 and the spring retainer collar 24. The return spring 66 will tend to keep the connector loop 38 of the barrel springs 36 at approximately the same position on the split ring member 64 with the mentioned slight variation. In order to obtain furhter dampening action, a snubber ring 72 is fitted around the circumference of apertures 58 of the tubular base member 12. This snub or ring 72 is made of rubber or some other cushioning material such as felt and assists in preventing snub resonance when the said fingers 22 of the spider 18 "bottom" on the wall of the aperture 58. One of the great advantages in applicants' isolator is that at almost all frequencies above the natural frequency of the mount except for the instant when natural or snub resonance is met, isolation occurs. You will note that the barrel springs are in angular relationship to the axis of the isolator 10.

Figure 31:
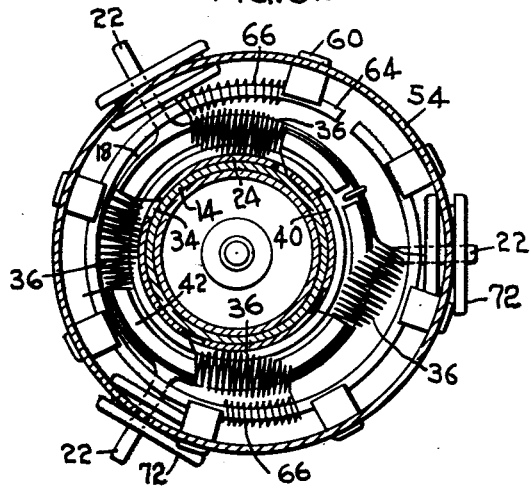
FIG. 31 is a section view with isolator moved to left.

If we were to apply a force at right angles to the axis of the isolator 10, the barrel springs 36 farthest from the force will move against the split ring member 64 creating a frictional dampening action. You will also note that one or more of the barrel springs 36 on the sides of the point where the forces are applied is placed under a stretching tension tending to return the assembly 52 to its normal or neutral position. Also, one or more of the return springs 66 will also be compressed by the barrel spring under stretching tension, an additional factor, acting to return the anti-vibration assembly 52 to its normal or neutral position (see FIG. 31).

Applicants' isolator 10 is so designed that there will be little if any rotation of the anti-vibration assembly 52, and at high frequencies, this tendency is converted into the "bannana-like" motion mentioned heretofore.

Experimentation and testing has indicated that applicants' vibration isolator 10 will create approximately equivalent resonant frequency for all possible directions of vibration or orientation. The return spring 66 functions to place the fingers 22 of the spider, and as a matter of fact the full vibration assembly 52, in a neutral position, thus cutting down on possible rattling in the assembly. Amplification of vibrating forces is kept to a minimum on the object to be isolated for several reasons among which are the following:

(1) The action of the barrel springs under tension is non-linear.

(2) This non-linear action is constantly varied slightly by the movement of the connector loop 38 of the barrel springs 36.

(3) The frictional reaction of the barrel springs 36 against the spring retainer collar 24 of the damper collar 46.

(4) The action of the fingers 22 of the spider 18 against the snub ring 72. The stretching of some of the barrel springs under certain conditions of vibration and in the same vein the compression of some of the return springs 66.

In comparing applicants' vibration isolator with isolators used heretofore combining a barrel spring and a damper cage, the attachment is usually made from the center of the vibration isolator toward the axis of the isolator. See United States Letters Patent to W. E. Barber et al. mentioned herein. Applicants' device on the other hand has the axis of the springs in the exact opposite direction (i.e. from the center away from the axis).

If tilting of the anti-vibration assembly 52 should occur, all the springs will react to pull the assembly 52 back into a normal or neutral position. It is possible in the applicants' device to control the non-linearity of the action by varying the thickness of the split ring member 64.

The advantage of applicants' device over those isolators which have the barrel springs under tension is considerable when we are concerned with the useful life of the isolator. Obviously a spring under tension will have a shorter life span than one like the applicants'.

Since certain other obvious modifications may be made in this device without departing from the scope of the invention, it is intended that all matter contained herein be interpreted in an illustrative and not in a limiting sense.

We claim:

1. A vibration isolator comprising a base member, an anti-vibration assembly associated with said base member, barrel springs connecting said base member and said anti-vibration assembly, said springs each having a terminal end circumferentially movable relative to said base member and a return spring abutting one of said barrel springs.

2. A vibration isolator comprising a base member having a body, an anti-vibration assembly and barrel springs, said base member having a ring member associated with said anti-vibration assembly and supporting the movable ends of said barrel springs, and a return spring associated with said ring member, said return spring surrounding said ring member and abutting some of the movable ends of the first mentioned spring.

3. A vibration isolator comprising a base member havin a tubular body and a flange, an anti-vibration assembly and barrel springs, said base member having a pair of ring members associated with said anti-vibration assembly and supporting the movable ends of said springs and a pair of return springs associated with said ring member, said return springs surrounding each individual ring member and abutting the movable end of the first mentioned spring.

4. A vibration isolator comprising a base member having a tubular body, an anti-vibration assembly and barrel springs, a pair of split ring members attached to said body near the open ends of said body, an anti-vibration assembly disposed within said body and movably attached to said split ring members by said barrel springs, a series of helical return springs each of which is disposed about said split ring members in abutting relationship with a terminal end of one of said barrel springs, said anti-vibration assembly having a columnar member adapted to engage an object to be isolated and having a pair of damper collars, a pair of damper springs disposed about said columnar member of said damper springs compressed against one of said damper collar, of the other of said damper springs compressed against the other damper collar each of said damper collars abutting said barrel springs.

5. A vibration isolator as set forth in claim 4 wherein apertures are formed in said tubular body, the edges of said apertures having absorptive covers formed to cooperate with a means on said anti-vibration assembly to damp excessive vibrations occurring within said anti-vibration assembly.

References Cited in the file of this patent

UNITED STATES PATENTS

| | | |
|---|---|---|
| 1,880,982 | Rawlings | Oct. 4, 1932 |
| 2,894,711 | Wingard | July 14, 1959 |